US005468921A

United States Patent [19]

Blake et al.

[11] Patent Number: 5,468,921
[45] Date of Patent: Nov. 21, 1995

[54] EXTENDED COMMUNICATION CABLE FOR A LIGHT PEN OR THE LIKE

[75] Inventors: Carl D. Blake; Karl E. Harrar, both of Tucson, Ariz.

[73] Assignee: Boeckeler Instruments, Inc., Tucson, Ariz.

[21] Appl. No.: 289,199

[22] Filed: Aug. 11, 1994

[51] Int. Cl.[6] .................................................. G08C 21/00
[52] U.S. Cl. ........................... 178/18; 345/180; 345/182; 345/183
[58] Field of Search ..................... 178/18, 19; 345/179, 345/182, 183

[56] References Cited

U.S. PATENT DOCUMENTS 5,051,736  9/1991  Bennett et al. ............................ 178/19

Primary Examiner—Stephen Chin
Assistant Examiner—Kevin Kim
Attorney, Agent, or Firm—Ogram & Teplitz

[57] ABSTRACT

An improved communication channel between two sites in which power for the second site is communicated via the cable from the first site's electrical source. Since the electrical source is used to create a higher voltage instead of power from the host apparatus at the first site, enhanced transmission is possible permitting the cable to extend in excess of one hundred fifty feet. Further, since the remote second site does not require any power at its location, it can operate in a wider range of applications and environments.

19 Claims, 2 Drawing Sheets

5,468,921

EXTENDED COMMUNICATION CABLE FOR A LIGHT PEN OR THE LIKE

BACKGROUND OF THE INVENTION

This invention relates generally to electronic devices and more particularly to communication cables for the transmission of digital data.

As the electronic age have progressed, electronic devices has reached into areas which were initially not contemplated. No longer is there a central computer room in which all of the sundry devices are housed within easy reach of each other. Today, electronics are truly ubiquitous with devices being found in homes, schools, factories, stadiums, and gyms. Indeed, it is difficult to identify a place where computers and their electronic cousins are not found.

As this proliferation has continued, there has been a growing need to permit these various devices to communicate with each other so that the assemblage is made more powerful.

The accepted maximum distances for transmission using an RS232 connector is about fifty feet; for TTL digital signals, the distance drops to only five feet.

For short distances of less than about one hundred feet, in-line amplification of a digital signal from a host computer has been sufficient to transmit the digital electronic signal along an interconnecting cable. This approach though assumes that the other end, the remote site, has its own power supply to also amplify the signal for the return trip.

Also, in some moderate distances, there are severe line-loss considerations which is addressed only by putting in intermediate stations which act to re-transmit the digital signals. This solution to the distance limitation increases the costs of the systems dramatically and also requires intermediate power sources between the two sites.

For extremely long distances, the use of the telephone lines and a Modem has been developed. The Modem modulates and demodulates signals so that the digital signals from a computer can communicate over established phone lines.

This solution is for extremely long distances and is not practical, due either to cost or complexity of installation, for shorter distances or where the location of the remote site is moved often.

It is clear from the foregoing that there is a need for a communication system which easily and inexpensively addresses the middle distances of over one hundred fifty feet but less than miles.

SUMMARY OF THE INVENTION

The invention is an improved communication channel between two sites in which power for the second site is communicated via the cable from the first site's electrical source. Powering the remote site is done using the electrical source located at the local site. This permits enhanced transmission; thereby permitting the cable to extend in excess of one hundred fifty feet. Further, since the remote second site does not require any power at its location, it can operate in a wider range of applications and environments.

The two sites are interconnected by a cable system which is preferably constructed of twisted pairs of wires. The cable system serves two basic functions: (1) it communicates an electrical current to the remote site for powering that site; and, (2) it provides a channel for the communication of the digital signals between the sites.

In the preferred embodiment, the cable is at least one hundred fifty feet in length.

The power from the remote site is obtained initially from an alternating-current source such as a typical electrical socket operating at 110 volts and 60 hertz. This alternating-current, via a transformer, is converted into a direct current voltage, preferably nine volts.

Using one pair of the twisted pairs within the cable, the direct-current is communicated to the remote site.

At the remote site is a driver unit which is powered by the direct-current. Further, a digital input device, such as a light pen, is also located at the remote site and is likewise powered, either directly or indirectly, by the direct current. In some situations, the direct current from the cable must again be transformed into another voltage so that it can be used by the light pen or digital input device. In the preferred embodiment, this second direct-current is at five volts which complies with the voltage requirements of most light pens.

As the light pen or other such device generates digital signals, these digital signals are communicated to the driver unit which communicates them back to the first site via the cable.

At the first site, a receiver unit receives the digital signals and changes them into a form acceptable by the host electronic device. Power for the receiver unit is derived from the host electronic device.

In this context, the host electronic device is any device well known to those of ordinary skill in the art, such as: a computer, an automated testing apparatus, an electronic testing apparatus, and the like.

In an alternative embodiment, a driver at the first site permits digital signals from the host to be communicated to the remote site which uses a receiver to accept and transform the signals for use by the digital input device. These received digital signals are used to change the state of the digital input device.

The invention, together with various embodiments thereof, will be more fully shown by the accompanying drawings and the following descriptions.

DRAWINGS IN BRIEF

DRAWINGS IN DETAIL

Figure 1:
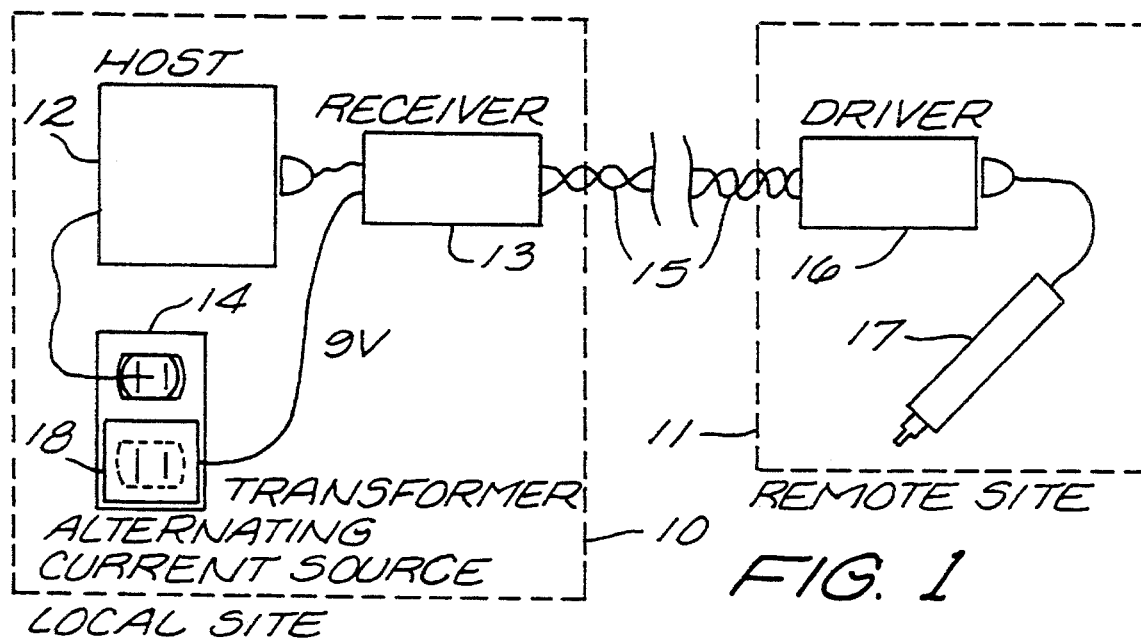
FIG. 1 is a functional layout of the preferred embodiment of the invention.

FIG. 1 is a functional layout of the preferred embodiment of the invention.

The preferred embodiment permits the communication from a remote site 11 to a local site 10 via cable 15. At the local site, the host electronic apparatus 12 (e.g. a computer, electronic test equipment) receives its power from an alternating-current source 14. Using this electrical source, the host apparatus 12 converts the alternating-current to a usable direct-current which is then communicated to receiver 13 for its power needs.

In the preferred embodiment, receiver 13 is a quad RS485 line receiver. Those of ordinary skill in the art readily recognize other receiver units which will serve in this function.

Receiver 13 also receives a direct-current, nine volts in the preferred embodiment, from transformer 18 which converts the alternating-current from source 14. Receiver 13 does not use the electrical current from transformer 18, rather, this direct-current is communicated via cable 15 to the remote site.

Cable 15, in the preferred embodiment is composed of two sets of twisted pairs of wires. In another embodiment, four sets of twisted wires are used permitting different signals to be communicated over each set. In this illustration, over one set of twisted pair, the direct-current is communicated to the remote site; it is this direct-current which powers the remote site.

At the remote site 11, the direct-current is either used directly or is voltage regulated to create the appropriate voltage for powering the various components of the remote site 11.

Within remote site 11 is a driver unit, a RS485 Driver, in the preferred embodiment; those of ordinary skill in the art readily recognize other drivers which will serve in this function.

Driver 16 communicates with light pen 17. Light pen 17, in the preferred embodiment acts as a digital signal generator creating digital signals which the driver 16 sends over cable 15 to receiver 13. Other devices, besides a light pen, are also applicable for this context and are well known to those of ordinary skill in the art.

The communication of the digital signals from light pen 17 is through driver 16 which communicates these signals over one (or more) of the pairs of twisted wires within cable 15. Note, in the preferred embodiment, communication between the local site 10 and the remote site 11 is one-way, from the remote 11 to the local 10.

These digital signals from cable 15 are taken by receiver 13 and communicated to the host unit 12 for its use.

In this manner, remote site 11 is powered from the local site at a voltage which permits a much longer cable to be used than is currently available. In the preferred embodiment cable 15 is at least one hundred fifty feet and is extendable to lengths of a thousand feet or more.

Figure 2:
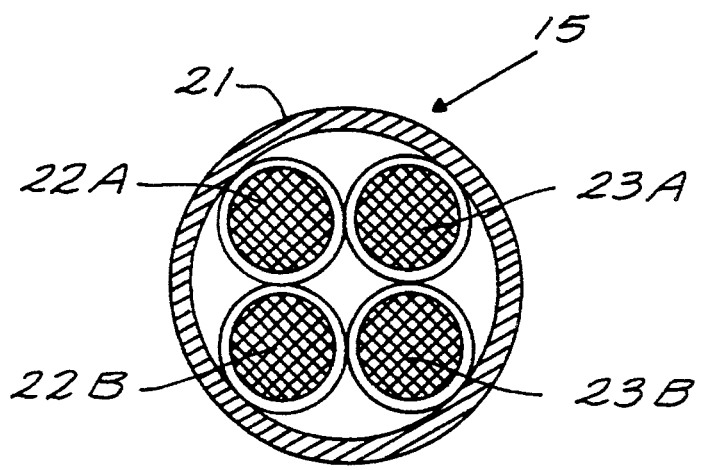
FIG. 2 is a cross-sectional view of the preferred cable used in the embodiment of FIG. 1.

FIG. 2 is a cross-sectional view of the preferred cable used in the embodiment of FIG. 1.

Cable 15, of FIG. 1, is covered by a protective layer 21. Inside are two twisted pairs of wires 22A/22B and 23A/23B. Twisted pair 22A and 22B are used to communicate the direct-current to the remote site; while twisted pair 23A and 23B are used to communicate the digital signals from the remote site to the local site.

In this manner, cable 15 is used to both power and provide a one-way communication channel between the two sites.

Figure 3:
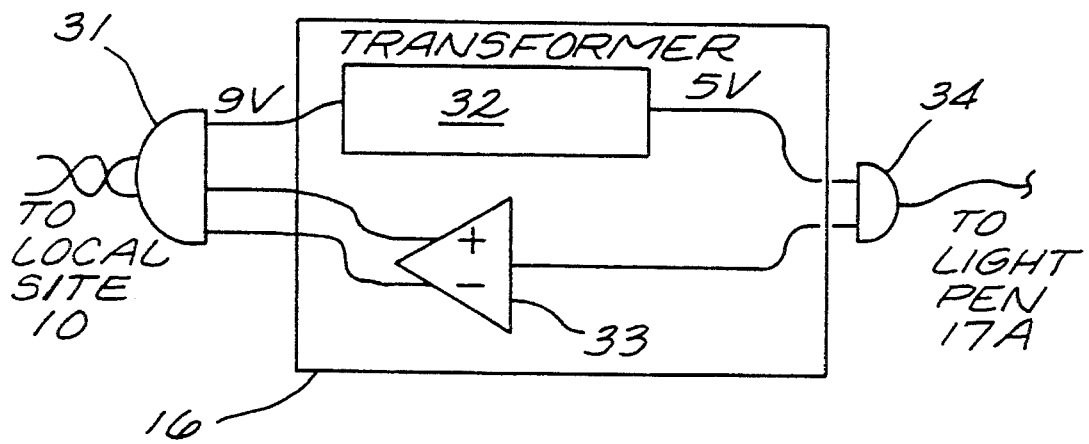
FIG. 3 is a block diagram of the driver unit as embodied in the preferred embodiment.

FIG. 3 is a block diagram of the driver unit as embodied in the preferred embodiment.

Connector 31 is used to link driver 16 with the cable communicating with the local site 10. The connector 31 communicates the direct-current, nine volts in this embodiment, to a transformer 32 which converts the original direct-current into a second direct-current of five volts for use within the remote site. Other voltages are clear to those of ordinary skill in the art. Connector 34 is used to communicate the second direct-current to the light pen 17A.

Digital data from light pen 17A is communicated to TTL 33 which formats it for communication through connector 31 and one pair of the twisted wires to the local site 10.

Figure 4:
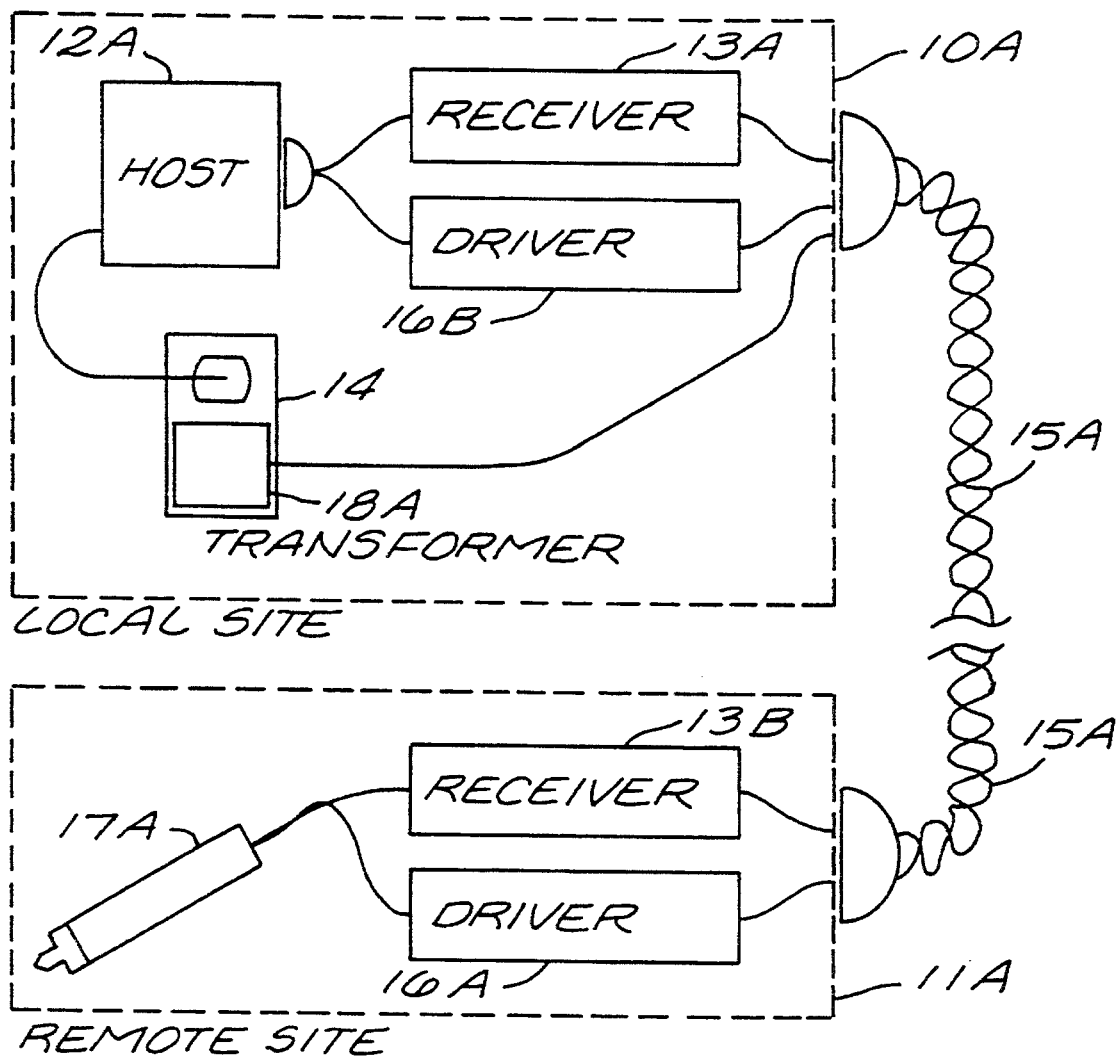
FIG. 4 is a functional layout of an alternative embodiment.

FIG. 4 is a functional layout of an alternative embodiment of the invention.

As with the preferred embodiment of FIG. 1, the alternative embodiment has local site 10A, remote site 11A and cable 15A communicating therebetween. Alternating-current source 14 provides the electrical power for all of the apparatus either via host apparatus 12A or transformer 18A. As before, the direct-current from transformer 18A is communicated to the remote site 11A, except that in this embodiment, the direct-current is passed directly to cable 15A and not through receiver 13A.

Receiver 13A is designed to receive digital information from the remote site 11A while driver 16B is designed to communicate digital information from the local site 10A to the remote site 11A. The digital information sent to the remote site, in this embodiment, is used to change the state of the light pen 17A, thereby adjusting light pen 17A's capability or function.

The digital information from the local site 10A is sent by way of driver 16B which communicates with receiver 13B. Digital information from the remote site 11A to the local site 10A is communicated using driver 16A and receiver 13A.

Figure 5:
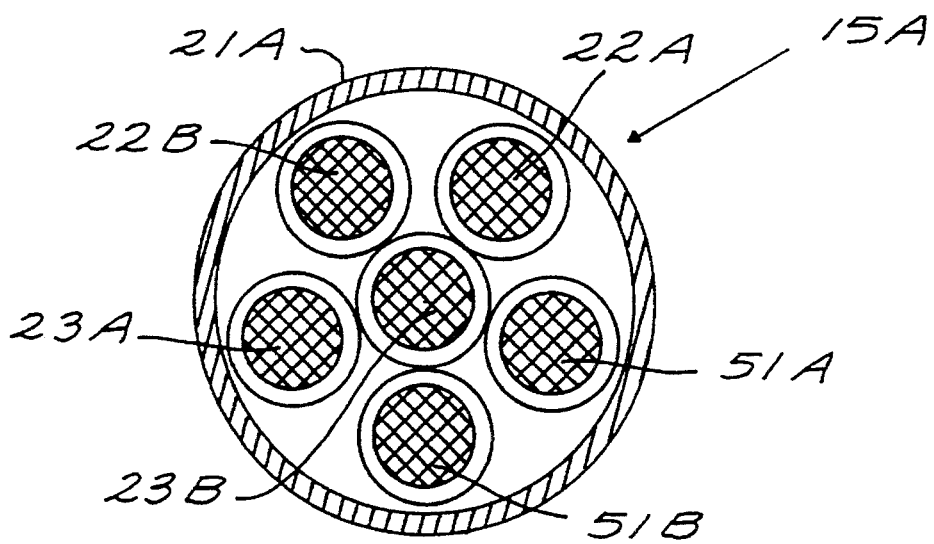
FIG. 5 is a cross-sectional view of the cable used in the alternative embodiment of FIG. 4.

FIG. 5 is a cross-sectional view of the cable used in the alternative embodiment of FIG. 4.

As with the preferred embodiment of the cable 15, cable 15A as used in the alternative embodiment illustrated in FIG. 4, uses twisted pairs of wires. Three sets of twisted pairs are used in this embodiment: wires 22A and 22B for carrying the direct-current to the remote site 11A; wires 23A and 23B for carrying the digital signal from the remote site 11A to the local site 10A; and wires 51A and 51B for carrying the digital signal from the local site 10A to the remote site 11A.

This embodiment permits two way communication between the sites while also permitting cable 15A to extend to well over one hundred fifty feet.

It is clear from the foregoing that the present invention creates a new and improved communication channel between a host apparatus and a remote digital input device.

What is claimed is:

1. A communication system comprising:

a) an electronic host apparatus having a first receiver unit in operative communication therewith, said first receiver unit receiving power from said host apparatus;

b) a digital input mechanism generating a first digital signal;

c) a first driver unit in operative communication with said digital input mechanism, said driver unit further communicating with said first receiver unit via a cable system, said first driver unit for receiving said first digital signals from said digital input mechanism and sending said first digital signals to said host apparatus via said cable system and said first receiver unit;

d) a second driver unit in operative communication with said host apparatus, said second driver unit receiving data from said host apparatus and being powered therefrom;

e) a second receiver unit in operative communication with said digital input mechanism, said cable system communicating a second digital signal from said second driver unit to said digital input mechanism via said second receiver unit; and, f) transformer means for converting electricity from an alternating-current electrical source into a first direct-current electrical flow, said first direct-current electrical flow being communicated to said first driver unit via said first receiver unit and said cable system, said first direct-current electrical flow further being communicated to said second receiver unit via said first driver unit and said cable system.

2. The communication system according to claim 1 wherein each of said driver units includes:
   a) means for converting said first direct-current electrical flow into a second direct-current electrical flow having a voltage different from that of said first direct-current electrical flow; and,
   b) means for communicating said second direct-current electrical flow to said digital input mechanism for powering said digital input mechanism.

3. The communication system according to claim 2 wherein said digital input mechanism includes a light pen.

4. The communication system according to claim 1 wherein said cable system is at least one hundred fifty feet long and no more than one thousand feet long.

5. The communication system according to claim 4 wherein said cable system includes:
   a) a first pair of twisted wires for communicating said first direct-current electrical flow to said driver unit; and,
   b) a second pair of twisted wires for communicating digital information from said driver unit to said receiver unit.

6. The communication system according to claim 5 wherein said second pair of twisted wires communicates only from said driver unit to said receiver unit.

7. The communication system according to claim 6 wherein said digital input mechanism changes states in response to said second digital signal.

8. A communication channel and powering system for communication between a digital input device and a computer comprising:
   a) a first receiver unit communicating with said host computer and receiving power from said host computer;
   b) a first driver unit receiving digital signals from said digital input device;
   c) a second driver unit communicating with said host computer, said second driver unit receiving digital signals and power therefrom;
   d) a second receiver unit communicating with said digital input device and said second driver unit, said second receiver unit receiving digital signals from said second driver unit and transferring said digital signals to said digital input device;
   e) a cable channel connecting said first receiver unit with said first driver unit and said second receiver with said second driver unit respectively; and,
   f) a transformer means for converting electricity from an alternating-current electrical source into a first direct-current electrical flow, said first direct-current electrical flow being communicated to said first driver unit and said second receiver unit via said cable channel for powering said first driver unit and said second receiver unit.

9. The communication system according to claim 8 wherein each of said driver units includes:
   a) means for converting said first direct-current electrical flow into a second direct-current electrical flow having a voltage different from that of said first direct-current electrical flow; and,
   b) means for communicating said second direct-current electrical flow to said digital input mechanism for powering said digital input mechanism.

10. The communicating channel and powering arrangement according to claim 8 wherein said cable channel is at least one hundred and fifty feet and more that one thousand feet long.

11. The communication channel and powering arrangement according to claim 10 wherein said cable channel includes:
   a) a first pair of twisted wires for communicating said first direct-current electrical flow to said driver unit; and,
   b) a second pair of twisted wires for communicating digital information from said driver unit to said receiver unit.

12. The communication channel and powering arrangement according to claim 11 wherein said second pair of twisted wires communicates only from said driver unit to said receiver unit.

13. The communication system according to claim 12 wherein said digital input mechanism changes states in response to said second set of digital signals.

14. An electronic system comprising:
   a) a first site having located therein,
      1) an electronic host apparatus,
      2) an alternating-current power source providing power to said electronic host apparatus,
      3) a first receiver unit communicating with said host apparatus and receiving power from said host apparatus,
      4) a first driver unit in operative communication with said host apparatus, said first driver unit receiving digital data from said host apparatus and receiving power from said host apparatus, and,
      5) transformer means for converting electricity from said alternating-current electrical source into a first direct-current electrical flow;
   b) a remote second site being at least one hundred fifty feet from said first site and no more than one thousand feet from said first site, said remote second site having,
      1) a second driver unit in operative communication with a digital input mechanism generating a digital signal communicated to said second driver; and
      2) a second receiver unit in operative communication with said second driver unit and said digital input mechanism, said second receiver communicating a second digital signal from said second driver unit to said digital input mechanism; and,
   c) a cable system interconnecting said first site with said remote second site such that said first direct-current electrical flow is communicated to said remote second site for powering said remote second site, a first digital signal from said second driver is communicated to said host apparatus via said first receiver unit, and, a first digital signal from first driver is communicated to said digital input mechanism via said second receiver unit.

15. The communication system according to claim 14 wherein each of said driver units includes:
   a) means for converting said first direct-current electrical flow into a second direct-current electrical flow having a voltage different from that of said first direct-current electrical flow; and,
   b) means for communicating said second direct-current electrical flow to said digital input mechanism for powering said digital input mechanism.

16. The electronic system according to claim 15 wherein said digital input mechanism includes a light pen.

17. The electronic system according to claim 14 wherein said cable system includes:
   a) a first pair of twisted wires for communicating said first direct-current electrical flow to said driver unit; and,
   b) a second pair of twisted wires for communicating digital information from said driver unit to said receiver unit.

18. The electronic system according to claim 17 wherein said second pair of twisted wires communicates only from said driver unit to said receiver unit.

19. The electronic system according to claim 18 wherein said digital input mechanism changes states in response to said second set of digital signals.

* * * * *